United States Patent [19]

Yamagata et al.

[11] Patent Number: 5,122,864
[45] Date of Patent: Jun. 16, 1992

[54] VIDEO SIGNAL PROCESSING APPARATUS

[75] Inventors: Shigeo Yamagata, Kanagawa; Tsuguhide Sakata; Tomotaka Muramoto, both of Tokyo, all of Japan

[73] Assignee: Canon Kabushiki Kaisha, Tokyo, Japan

[21] Appl. No.: 635,418

[22] Filed: Jan. 3, 1991

Related U.S. Application Data

[63] Continuation of Ser. No. 244,614, Sep. 9, 1988, abandoned, which is a continuation of Ser. No. 122,565, Nov. 16, 1987, abandoned, which is a continuation of Ser. No. 754,339, Jul. 11, 1985, abandoned.

[30] Foreign Application Priority Data

Jul. 11, 1984 [JP] Japan .................................. 59-143724
Jul. 12, 1984 [JP] Japan .................................. 59-144781
Jul. 13, 1984 [JP] Japan .................................. 59-146205

[51] Int. Cl.$^5$ ............................................. H04N 9/47
[52] U.S. Cl. .......................................... 358/18; 358/11
[58] Field of Search ................... 358/11, 18, 313, 322, 358/324

[56] References Cited

U.S. PATENT DOCUMENTS

| 4,024,572 | 5/1977 | Derenbecher ........................ 358/18 |
| 4,148,058 | 4/1979 | Harwood et al. ..................... 358/18 |
| 4,488,170 | 12/1984 | Nillesen ................................ 358/26 |
| 4,509,072 | 4/1985 | Elmis et al. ........................... 358/17 |

FOREIGN PATENT DOCUMENTS

| 15225 | 2/1977 | Japan ...................................... 358/18 |
| 170182 | 10/1983 | Japan ...................................... 358/18 |
| 170183 | 10/1983 | Japan ...................................... 358/18 |

Primary Examiner—John W. Shepperd
Attorney, Agent, or Firm—Toren, McGeady & Associates

[57] ABSTRACT

A video signal processing apparatus, for processing a video signal including line-sequential signals, is arranged to detect the kinds of information included in the line-sequential signals obtained during each horizontal scanning period; to collect, for every predetermined period, statistics of a detection output thus obtained; and to rearrange the line-sequential signals into simultaneous signals in accordance with a control signal generated on the basis of the statistics.

23 Claims, 11 Drawing Sheets

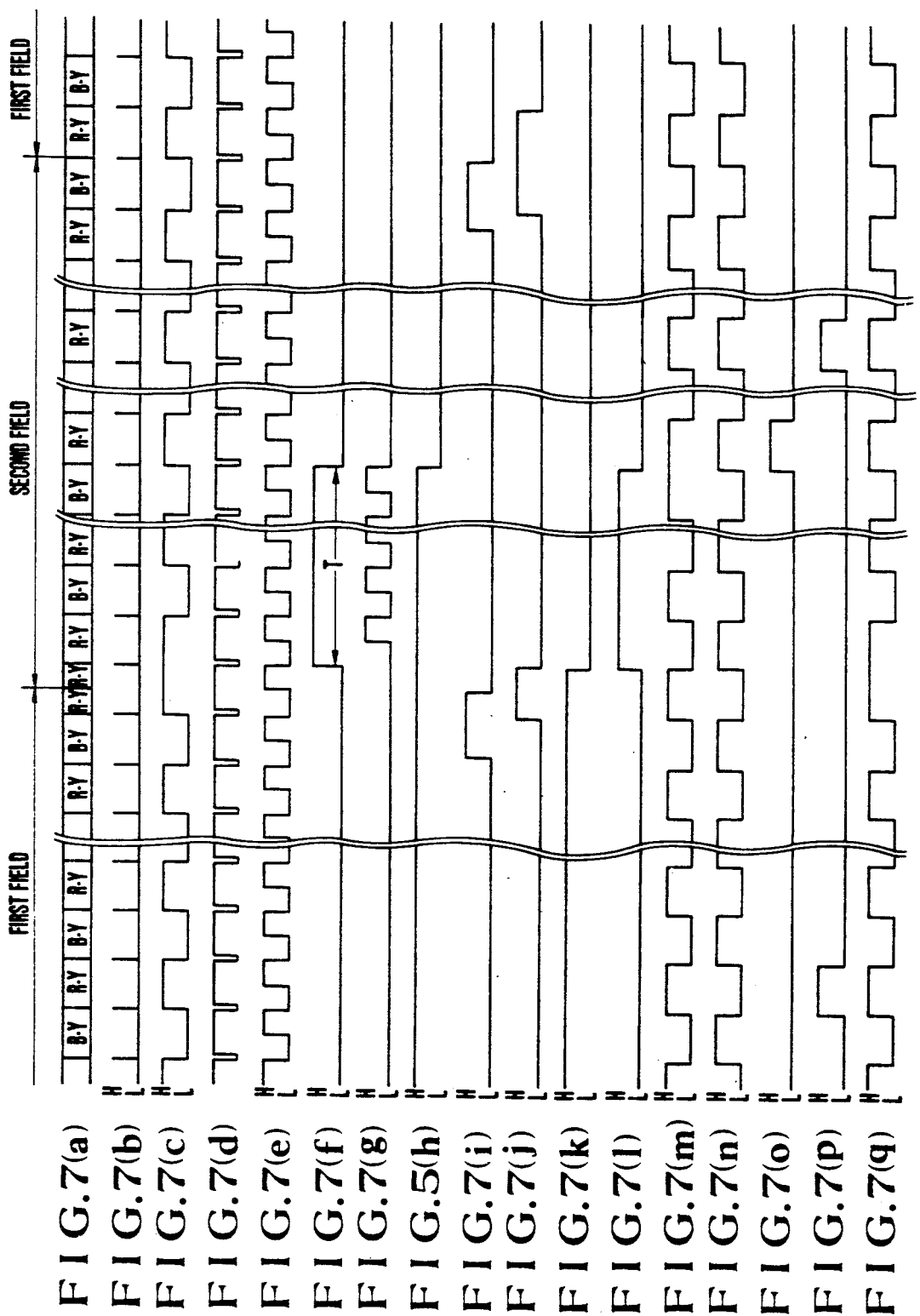

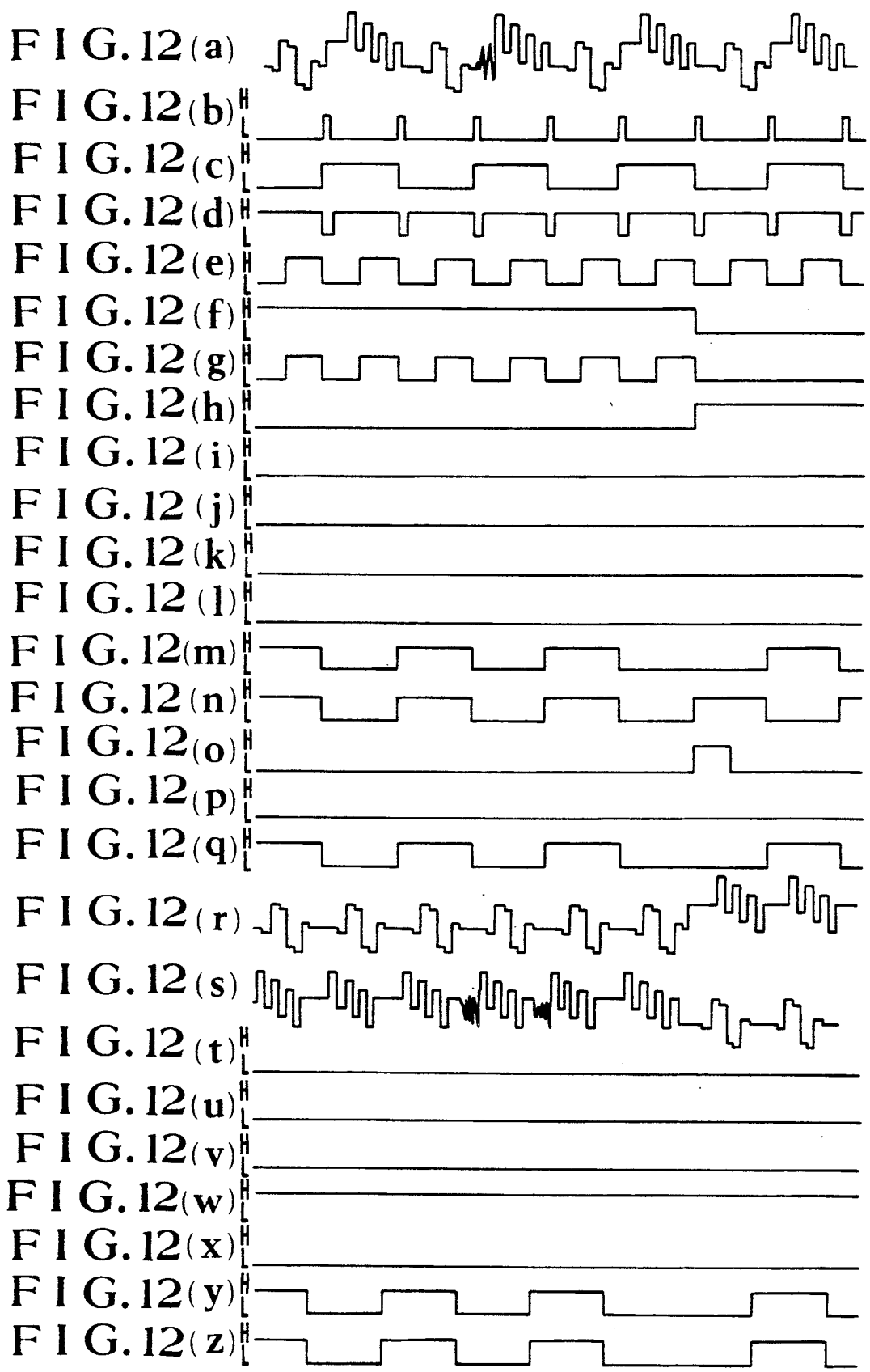

VIDEO SIGNAL PROCESSING APPARATUS

This is a continuation application of Ser. No. 07/244,614, filed Sep. 9, 1988, now abandoned; which in turn is a continuation application of Ser. No. 07/122,565, filed Nov. 16, 1987, now abandoned; and which is a continuation application of Ser. No. 06/754,339, filed Jul. 11, 1985, now abandoned.

BACKGROUND OF THE INVENTION

1. Field of the Invention

This invention relates to a video signal processing apparatus, and more particularly, to an apparatus adapted for processing a video signal including line-sequential signals.

2. Description of the Prior Art

Generally, in rearranging line-sequential signals into concurrent or simultaneous signals, the kinds of the line-sequential signals must be discriminated from each other for every horizontal scanning period (hereinafter referred to as an H period). Therefore, in recording or transmitting these signals, they are arranged into some signal forms that permit discrimination of their kinds. For example, in line-sequentially recording signals of two different kinds, they have been arranged to have their DC components offset at every two H periods, to be frequency offset or to have a flag signal added at every interval of two H periods.

However, when the kinds of the line-sequential signals which have been processed in this manner are to be discriminated, one from the other, by a reproduction system, the adverse effects of drop-outs, transmission distortion, etc. prevent accurate discrimination. The details of this problem will be understood from the following description of an example of the apparatus of the kind arranged to reproduce a still picture by continuously reproducing a video signal which has one field portion thereof recorded in each circular recording track formed on a magnetic sheet and includes line-sequential color difference signals with a DC offset arranged at every interval of two H periods:

FIG. 1 of the accompanying drawings shows in a block diagram the essential arrangement of the conventional reproducing apparatus of the above-stated kind. FIGS. 2(a) to 2(g) show the waveforms at various points (a) to (g) shown in FIG. 1. Referring to FIG. 1, line sequential color difference signals obtained from a reproduced video signal are arranged to be supplied to a terminal t1. A horizontal synchronizing signal obtained from the reproduced video signal is arranged to be supplied to another terminal t2. The reproducing apparatus comprises a sample-and-hold circuit 1; an amplifier 2 arranged to amplify the output of the sample-and-hold circuit 1; a comparator 3 arranged to compare the output of the amplifier 2 with a predetermined level; a D type flip-flop 4 (hereinafter referred to as DFF) arranged to receive the output of the comparator 3 as a data input and is triggered by the fall of the horizontal synchronizing signal, which is as shown in FIG. 2(d); a delay line 6 for delaying by 1 H period, which is 63.556 μsec; a monostable multivibrator 7 arranged to be triggered by the horizontal synchronizing signal (d) and to form a signal as shown in FIG. 2(b); and switches SW1 and SW2. The contact piece E of the switch SW1 is connected to one contact A thereof and the contact piece F of the switch SW2 to one contact C thereof when the signal produced from the DFF 4 is at a high level. The contact piece E is connected to the other contact B of the switch SW1 while the contact piece F is connected to the other contact D when the signal is at a low level. The color difference signals are thus rearranged into line simultaneous signals. The line simultaneous color difference signals are respectively supplied to terminals t3 and t4.

Let us assume that the line-sequential color difference signals include a signal of red (R)-luminance (Y) and a signal of blue (B)-luminance (Y) and that the color difference signal R−Y has a higher center level than the other color difference signal B−Y, and is recorded in a line offset manner. In this instance, if the signal R−Y is reproduced during a certain H period, a signal which is sampled and held by the fall of the signal (b) of the monostable multivibrator 7 is at a high level during this period. Accordingly, a signal (e) produced from the DFF 4 during a next H period is at a high level. In other words, if the output signal of the 1 H delay line 6 is the signal R−Y, the switch SW1 has its contact piece E connected to the contact A and the simultaneous signal R−Y is produced from the terminal t3. Meanwhile, a simultaneous signal B−Y is produced likewise from the terminal t4.

However, in obtaining line-simultaneous color difference signals from the line sequential color difference signals by the above-stated arrangement, it becomes nearly impossible to obtain the result of a sample-and-hold operation with correct DC offset in the event of some defect in the line sequential color difference signals obtained at the time of sampling, such as deterioration in the S/N ratio due to a drop-out or the like. In that event, the switching operation of the switches SW1 and SW2 becomes erroneous and the switch-over between the signals R−Y and B−Y might become converse. For example, the deterioration of the S/N ratio resulting from a drop-out A indicated in FIG. 2(a) would result in a converse switch-over operation during a period as indicated by B in FIG. 2(f). This error makes a reproduced picture very disagreeable. For example, a red line would appear on the picture of a blue color only. In the case of a still picture reproducing apparatus in particular, such S/N ratio deterioration due to a drop-out quite likely arises during the same H period. In that instance, a conspicuous line appears always in the same part of the reproduced picture.

SUMMARY OF THE INVENTION

It is a general object of the present invention to provide a video signal processing apparatus which is capable of eliminating the above-stated shortcoming of the arrangement of the prior art.

It is more specific object of the invention to provide a video signal processing apparatus which is capable of adequately performing a signal processing operation even in the event of a video signal of an extremely poor S/N ratio.

Under this object, a video signal processing apparatus, arranged as a preferred embodiment of the invention for processing video signals including line-sequential signals, comprises: means for rearranging the line sequential signals into line simultaneous signals; means for detecting the kinds of information included in the line sequential signals obtained during each horizontal scanning period; means for collecting statistics of the output of the detecting means produced during each predetermined period; and control means for controlling the rearranging means on the basis of the output of the statistics collecting means.

It is another object of this invention to provide a video signal processing apparatus which is capable of always adequately performing a signal processing operation in accordance with the nature of the video signal to be processed.

It is a further object of this invention to provide a video signal processing apparatus which is capable of always adequately performing a signal processing operation irrespective as to whether line sequential signals included in the video signal are in a normal state or in any other state.

Under that object, a video signal processing apparatus, arranged as another preferred embodiment of the invention for processing video signals including line sequential signals, comprises: means for rearranging the line sequential signals into line simultaneous signals; means for detecting the kinds of information included in the line sequential signals obtained during each horizontal scanning period; means for generating a periodic signal having a period related to the horizontal scanning period, said periodic signal being arranged to have the phase thereof vary for every predetermined period; and control means for controlling the rearranging means by selectively using either a signal produced from the detecting means or the signal produced from the periodic signal generating means.

These and further objects and features of this invention will become apparent from the following detailed description of preferred embodiments thereof taken in conjunction with the accompanying drawings.

BRIEF DESCRIPTION OF THE DRAWINGS

FIGS. 7(a) to 7(g) show, in a timing chart, the waveforms at various points in the embodiment shown in FIG. 3.

FIGS. 12(a) to 12(z) show, in a timing chart, the waveforms at various points in the reproducing apparatus of FIG. 9.

DETAILED DESCRIPTION OF THE PREFERRED EMBODIMENTS

Figure 1:
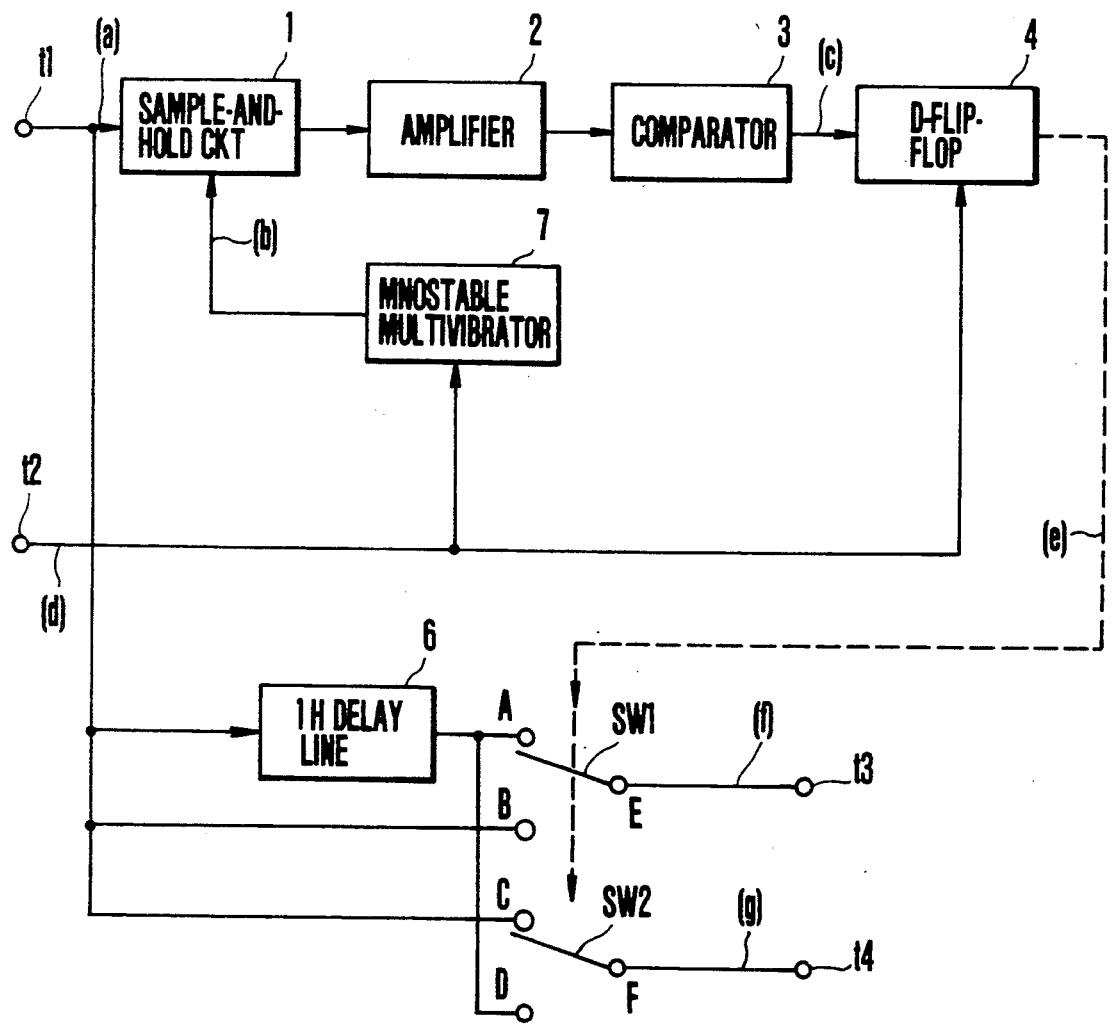
FIG. 1 is a diagram showing the arrangement of the essential parts of a conventional video signal reproducing apparatus.
Figure 2:
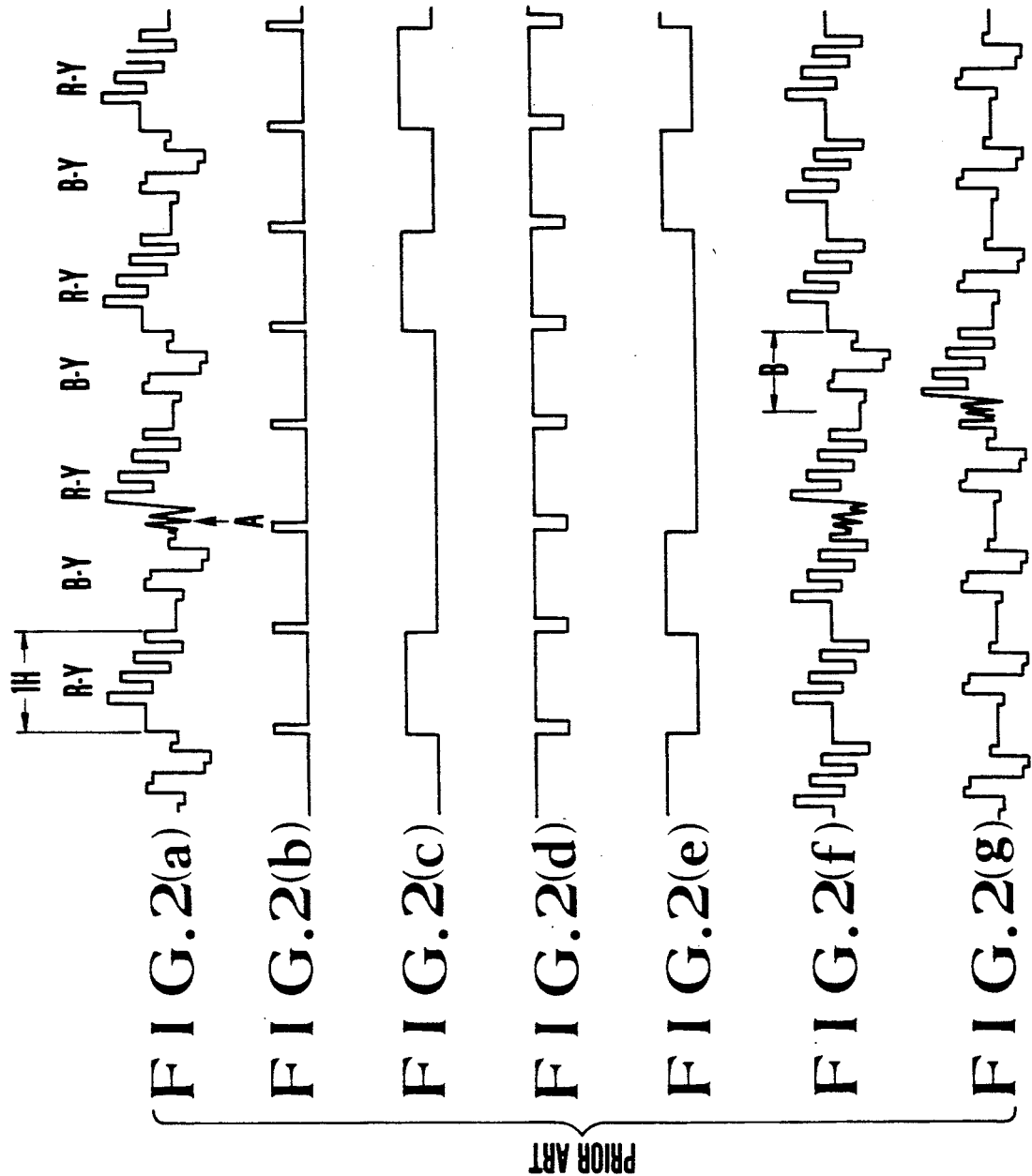
FIGS. 2(a) to 2(g) show in a timing chart, the waveforms at various points in FIG. 1.
Figure 3:
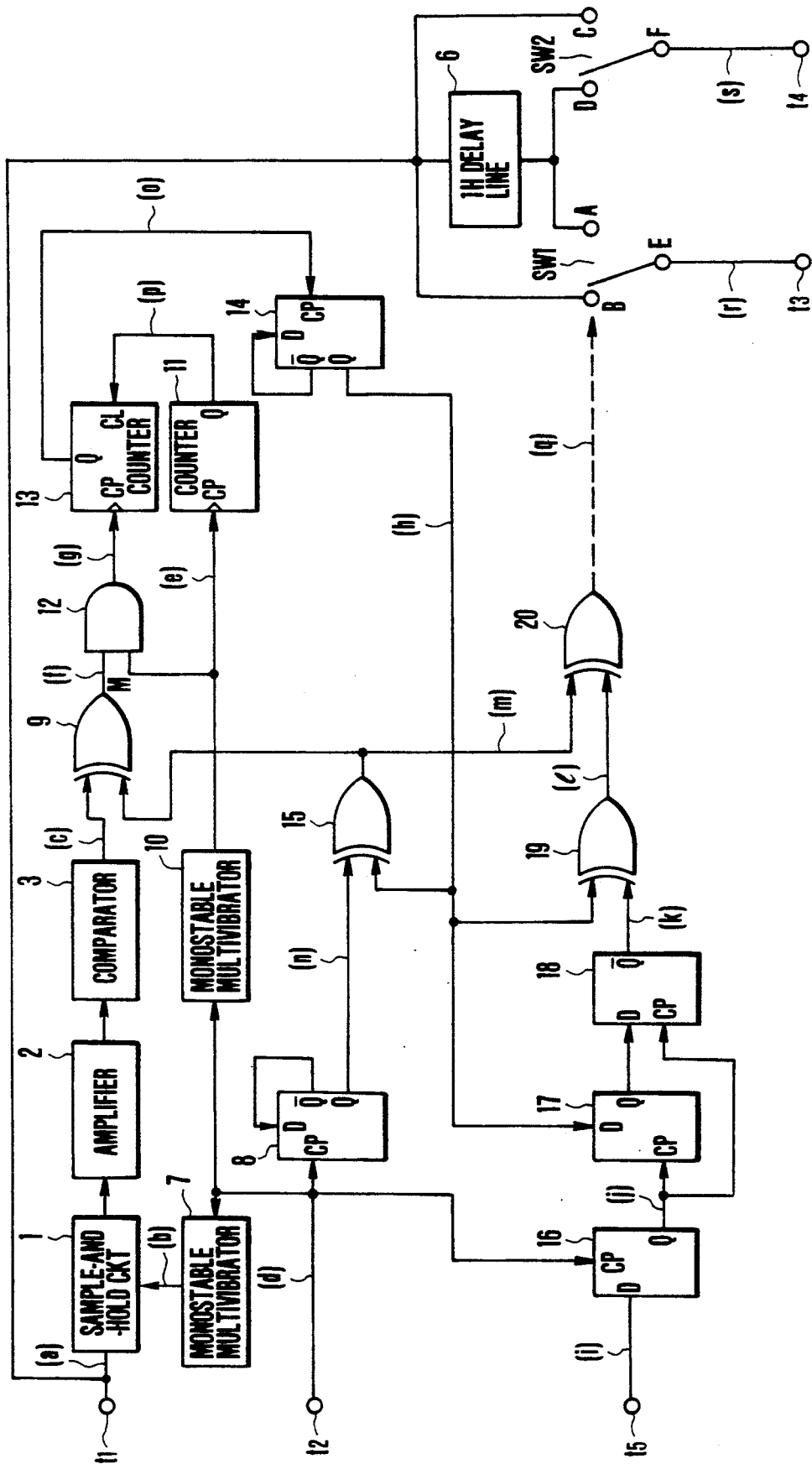
FIG. 3 is a diagram showing the arrangement of the essential parts of a reproducing apparatus arranged as an embodiment of this invention.

The details of this invention are as described in the following description of some embodiment thereof:

FIG. 3 shows the essential arrangement of a reproducing apparatus as an embodiment of this invention. FIG. 3 uses the same reference numerals and symbols for denoting the same component elements as those shown in FIG. 1. Description of these same elements is omitted here. The reproducing apparatus comprises a DFF 8 arranged to be triggered by the fall of a horizontal synchronizing signal (d); and exclusive OR circuit 9 (hereinafter referred to as EXOR); a monostable multivibrator 10 arranged to be triggered by the fall of the incoming horizontal synchronizing signal; a counter 11 arranged to count the number of pulses of a signal produced from the monostable multivibrator 10 and to produce a Q output at a high level when a predetermined number (for example $2^8$) of pulses have been counted; an AND gate 12 arranged to obtain a logical product of the signals produced from the EXOR 9 and the monostable multivibrator 10; a counter 13 arranged to count the number of pulses of a signal produced from the AND gate 12, to produce a Q output at a high level when a predetermined number (for example $2^7$) of pulses have been counted and to be reset by the Q output of the other counter 11; a DFF 14 arranged to be triggered by the rise of a signal produced from the counter 13 and to have its output inverted thereby; an EXOR 15 arranged to produce the exclusive OR of the Q outputs of the DFF 8 and the DFF 14; a DFF 16 arranged to receive as a data input a signal PG which comes from a terminal t5 in synchronism with the rotation of a magnetic sheet and to be triggered by the fall of the horizontal synchronizing signal (d); a DFF 17 arranged to be triggered by the fall of a signal produced from the DFF 16 and to receive the output signal of the DFF 14 as a data input; a DFF 18 which receives the output signal of the DFF 17 as a data input and is arranged to be triggered by the fall of the output of the DFF 16; an EXOR 19 arranged to receive the outputs of the DFF's 14 and 18; and an EXOR 20 arranged to receive signals produced from the EXOR's 15 and 19. The connecting positions of the switches SW1 and SW2 are arranged to be changed by the output of the EXOR 20.

Figure 4:
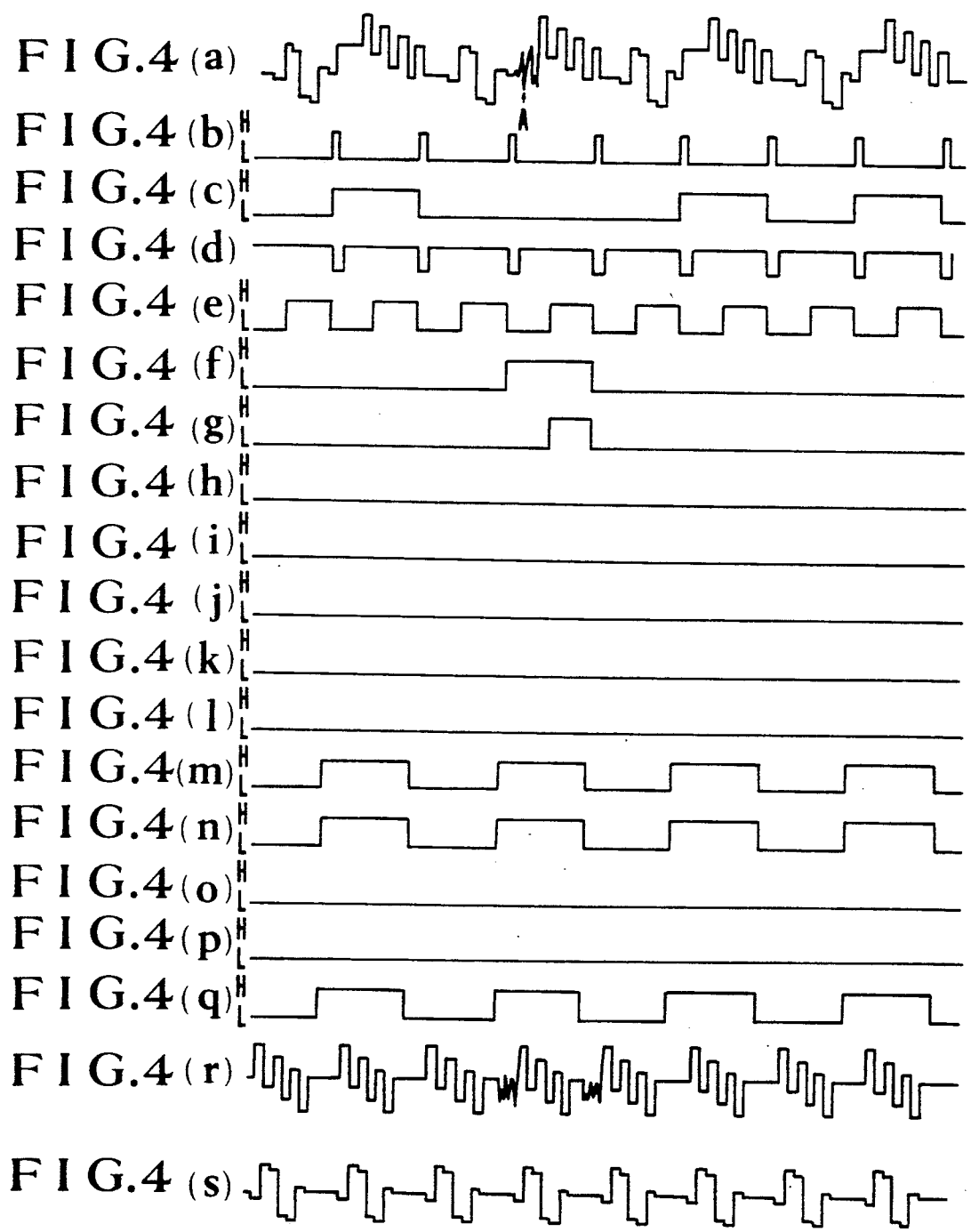
FIGS. 4(a) to 4(s) show, in a timing chart, the waveforms at various points in the reproducing apparatus shown in FIG. 3.

FIGS. 4(a) to 4(s) show, in a timing chart, the waveforms of various points (a) to (s) indicated in FIG. 3. Referring now to FIGS. 4(a) to 4(s), each of the component elements of the apparatus shown in FIG. 3 operates as follows: Line sequential color difference signals having DC offsets at intervals of 2 H periods as shown in FIG. 4(a) come through the terminal t1 and are supplied to the sample-and-hold circuit 1. FIG. 4(d) shows a horizontal synchronizing signal which is in phase synchronism with the horizontal synchronizing signal of a luminance signal (not shown). With this signal supplied, respectively, to the monostable multivibrators 7 and 10 and the DFF 8, signals are obtained as shown in FIGS. 4(b), 4(e) and 4(n). It is well known that the input signal (d) is arranged to be separately compensated for any drop-out or the like that might arise in the horizontal synchronizing signal.

The output signal (n) of the DFF 8 is supplied to the EXOR 15. The output signal of the EXOR 15, shown in FIG. 4(m), is supplied to the EXOR 20. Then, with the level of the output signal (q) of, the EXOR 20 changed over between a high level and a low level, the connecting positions of the switches SW1 and SW2 are also changed over in such a way as to give line simultaneous color difference signals in the same manner as in the case of the arrangement shown in FIG. 1. More specifically, the contact piece E of the switch SW1 is connected to one contact point A and the contact piece F of the switch SW2 to one contact point C when the output signal (q) of the EXOR 20 is at a high level. The contact piece E is connected to the other contact point B and the contact piece F to the other contact point D when the output signal (q) of the EXOR 20 is at a low level.

With the embodiment arranged in this manner, the phase of a change-over signal (q) for the change-over of the switches SW1 and SW2 never becomes discontinuous even in the event of deterioration of an S/N ratio due to a drop-out or the like which is as indicated by a reference symbol A in FIG. 4(a), because: The EXOR 15 receives as its input signal, a rectangular wave signal (n) of 2 H period which is synchronized with the horizontal synchronizing signal. As long as the other input signal (h) of the EXOR 15 and the other input signal (l) of the EXOR 20 are not inverted, the phase of the output signal (q) of the EXOR 20 never becomes discontinuous. Besides, as will be described in detail later, the output signal (h) of the DFF 14 is arranged to be inverted when a preset number of incoming pulses ($2^7$) have been counted by the counter 13 and, in addition to that, the output signal (l) of the EXOR 19 is not inverted when the signal PG is not supplied there. Such being the arrangement, the output signal (q) of the EXOR 20 is never inverted by the drop-out of several H periods.

Figures 5, 6A:
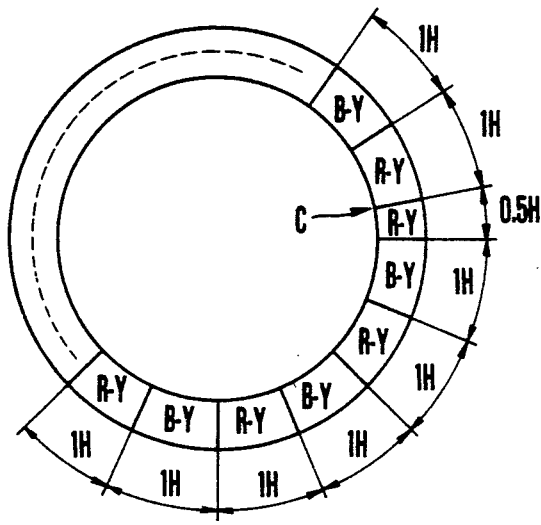
FIG. 5 is a schematic illustration of the recording format on a magnetic sheet to be used for the embodiment shown in FIG. 3.
FIGS. 6(a) to 6(e) are illustrations showing a signal processing operation generally applicable to signal joining parts in the recording format shown in FIG. 5.

The operation of the embodiment on the occasion of the inversion of the output signals (h) and (l) of the DFF 14 and the EXOR 19, is as follows: FIG. 5 schematically shows a recording format on a magnetic sheet usable for the embodiment. FIGS. 6(a) to 6(e) schematically show signal processing arrangement generally applied to the signal joining parts in the recording format shown in FIG. 5.

Referring to FIG. 5, if one field portion of recorded line sequential color difference signals (as well as a luminance signal) are reproduced as they are, there arises a skew of 0.5 H. As is well known, this can be compensated for by alternately taking out a signal coming through a ½ H delay line and a signal coming not through the delay line for every one field period. Then, a field picture is artificially obtained from such one field portion of the video signal.

Figure 6B:
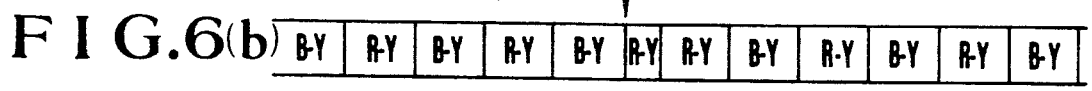
Figure 6C:
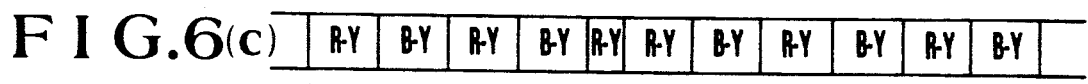
Figure 6D:
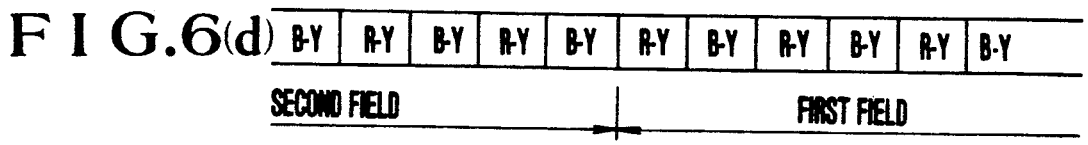
Figure 6E:
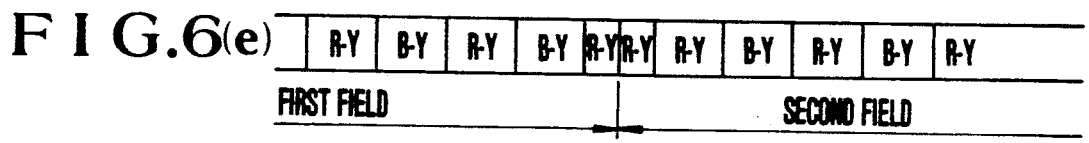

Referring to FIGS. 6(a) to 6(e), the fall of the signal PG is arranged to coincide with each signal joining part indicated by a reference symbol C in FIG. 5. In other words, signals which deviate ½ H as shown in FIGS. 6(b) and 6(c) are switched over for every field, as shown in FIGS. 6(d) and 6(e), in obtaining the line sequential color different signals. However, the alternating change in the kind of the color difference signals included in the line sequential color difference signals obtained in this manner, is interrupted at a shift from a first field to a second field as shown in FIG. 6(e) although it is uninterrupted in shifting from the second field to the first as shown in FIG. 6(d). To solve this problem, the phase of the output signal of the EXOR 20, which is used for change-over of the positions of the switches SW1 and SW2, must be made discontinuous.

FIGS. 7(a) to 7(g) show, in a timing chart, the waveforms at various points (a) to (g) in FIG. 3 which are obtained at the time of field change-over. FIG. 7(a) schematically shows the line sequential color difference signals. At the above-stated shifting point from the first field to the second field, the output signal (c) of the comparator 3 becomes discontinuous. However, the output signal (m) of the EXOR 15 remains continuous. Therefore, the level of the output signal (f) of the EXOR 9 changes to a high level. The output signal (e) of the monostable multivibrator 10 then passes through the AND gate 12 to have the fall thereof counted by the counter 13. When the counted value of the counter 13 reaches a preset value (128), the counter 13 produces a signal which remains at a high level for one H period as shown in FIG. 7(o). This signal causes the output signal (h) of the DFF 14 to be inverted. The output signal (m) of the EXOR 15 is also inverted. In other words, at this point of time, the output signal of the EXOR 15 also becomes discontinuous to coincide with the phase of the output signal (c) of the comparator 3. Following this, the level of the output of the EXOR 9 changes to a low level and the counting operation of the counter 13 comes to a stop.

Meanwhile, the signal PG (i) is supplied through the terminal t5 to the DFF 16. The output signal (j) of the DFF 16 is supplied to the DFF's 17 and 18. Then, the output signal (h) of the DFF 14, which is supplied as a data to the DFF 17 to be sampled and held as a data (the Q output of the DFF 17), is delayed by one field length and is further inverted. In other words, a signal (k), which precedes the signal (h) by about 128 H's, is produced from the DFF 18 as a $\overline{Q}$ output thereof. With the $\overline{Q}$ output (k) of the DFF 18 thus inverted, the output signal (l) of the EXOR 19 remains at a high level until the Q output (h) of the DFF 14 is inverted. During this period, the output signal (q) of the EXOR 20 is obtained by inverting the output signal (m) of the EXOR 15.

When reproduction is performed by rotating the magnetic sheet, as shown in FIG. 5, at an oridinary rotation speed (the same rotation speed as at the time of recording), the change in the kind of the color difference signals in the line sequential signals obtained by the reproduction is continuous during the shift from the second field to the first field, but discontinuous during the shifting from the first field to the second field, as shown in FIG. 6(d). FIG. 7 extractively shows the part of signals sequentially reproduced while the magnetic sheet is rotated at an ordinary speed, which part shifts from the first field signals to the second field signals. Although not shown, the first field signals and the second field signals are present on the left side of the first field signals, shown on the left side of the Figure. Thus, also in the portion not shown in the Figure, there is a discontinuity during the shifting from the first field to the second field. In this continuous portion, the output signal (h) of DFF 14 is inverted as described above, and the output signal (h) is inverted also in he second field period (not shown), two field periods before the second field shown in FIG. 7. In this case, however, the inversion is made from the low level to the high level.

Meanwhile, the D terminal of DFF 16 is supplied with PG (i) from the terminal t5, and the CP terminal is supplied with the horizontal synchronizing signal (d) from the terminal t2, while in DFF 16, the time of signal (j), obtained by sample-holding PG (i) at the time of falling of the horizontal synchronizing signal (d), is output from the Q terminal. This signal (j) is synchronized both with PG and the horizontal synchronizing signal and is supplied to the CP terminal of DFF 17, and the terminal D is supplied with the output signal (h) of DFF 14, so that in DFF 17, the output signal (h) is sample-held at the time of falling of the signal (j) to output the signal (x) (not shown) from the terminal Q.

As mentioned hereinbefore, the output signal (h) is inverted from the low level to the high level also in the second field period (not shown), two field periods before the second field shown in FIG. 7. The signal (x) (not shown), obtained by sample-holding the signal (h) at the time of falling of the signal (j), is inverted from the low level to the high level at the time of falling of the pulse of the signal (j) coming across the border point between the second field (not shown) and the first field, shown on the left in FIG. 7, and inverted from the high level to the low level at the time of falling of the pules of the signal (j) coming across the border point between the second field, shown in FIG. 7, and the first field, shown on the right in FIG. 7. Also, the timing of occurrence of the rising and falling edges is slightly delayed from the falling edge of the signal (j) input from the CP terminal.

The signal (x), thus obtained, is supplied to the D terminal of DFF 18, and the CP terminal is supplied with the signal (j) output from the Q terminal of DFF 16. In DFF 18, the signal (x) is sample-held at the time of falling of the signal (j), and inverted and outputted as the signal (k) from the terminal $\overline{Q}$. As stated hereinbefore, as the timing of occurrence of the rising and falling edges is slightly delayed from the falling edges of the signal (j), the signal (k) is at the low level at the time of falling of the pulse of the signal (j), coming across the border point between the second field (not shown) and the first field on the right in FIG. 7, and is at the high level at the time of falling of the pulse of the signal (j) coming across the border point between the second field shown in FIG. 7, and the first field shown on the right in FIG. 7, and the signal before the inversion of the signal (k) is inverted from the low level to the high level, at the time of the falling of the pulse of the signal (j) near the border point between the first field, shown on the left in FIG. 7, and the second field, shown in FIG. 7. By further inverting this inverted signal, the signal shown by FIG. 7(k) is obtained.

Thus, even in the event of the discontinued alternation of the line sequential color difference signals arising at the time of shift from the first field to the second, the switches SW1 and SW2 are operated in pursuance thereof. Further, with the exception that the output (c) of the comparator 3 and the output (m) of the EXOR 15 fail to coincide with each other while more than 128 H's within 256 H's are counted by the counter 13, the output (h) of the DFF 14 is never inverted. It is, therefore, nearly impossible that the output (q) of the EXOR 20 becomes descontinuous at any point of time other than the shifting point from the first field to the second field. The embodiment thus ensures a satisfactory rearrangement of the line sequential color difference signals into simultaneous signals by virtue of the switches SW1 and SW2 even in cases where the S/N ratio of the line sequential signals is extremely poor.

It is impossible to obtain such a waveform that is shown in FIG. 7(k) by using the signal PG immediately after commencement of reproduction. However, stable line simultaneous color difference signals can be obtained by the above-described operation when the signal PG and the rotation of the magnetic sheet coincide with each other with several frames having been reproduced at the most.

In the reproducing apparatus shown in FIG. 3, as described above, the line sequential color difference signals are rearranged into simultaneous signals by using two counters on the basis of a majority-deciding-like concept for determining the polarity of a control signal which controls the switches. Therefore, the rearrangement into the simultaneous signals is never erroneously performed even in the event of a video signal which is very poor in the S/N ratio due to a drop-out or the like.

Further, the embodiment is arranged to detect a point at which the polarity of the control signal for change-over of the rearranging switches becomes discontinuous and further, to make the polarity of the control signal discontinuous by using the signal PG. Therefore, any possible error in the polarity of the control signal is limited to a period during which there exists a phase error between the signal PG obtained at the time of recording and the signal PG obtained for reproduction. This arrangement thus ensures an accurate switch-over operation.

The counters 11 and 13, thus, form statistics collecting means for collecting statistics of a signal based on the kinds of information included in the line sequential signals, while the D type flip-flop 14 and the exclusive OR gates 15 and 20 form control means for controlling the rearranging of the line sequential signals based on the output of the statistics collecting means.

Further, with the amplifier 2 which operates after sample-and-holding arranged to be in tune for a frequency of ½ H to let it have some inertia, a minor drop-out of 1 to 2 H or thereabout can be absorbed by the inertia.

It is also possible to have a drop-out detection circuit arranged to mute the input to the counter 13 of FIG. 3 during a drop-out period on the occasion of a drop-out.

Figure 8:
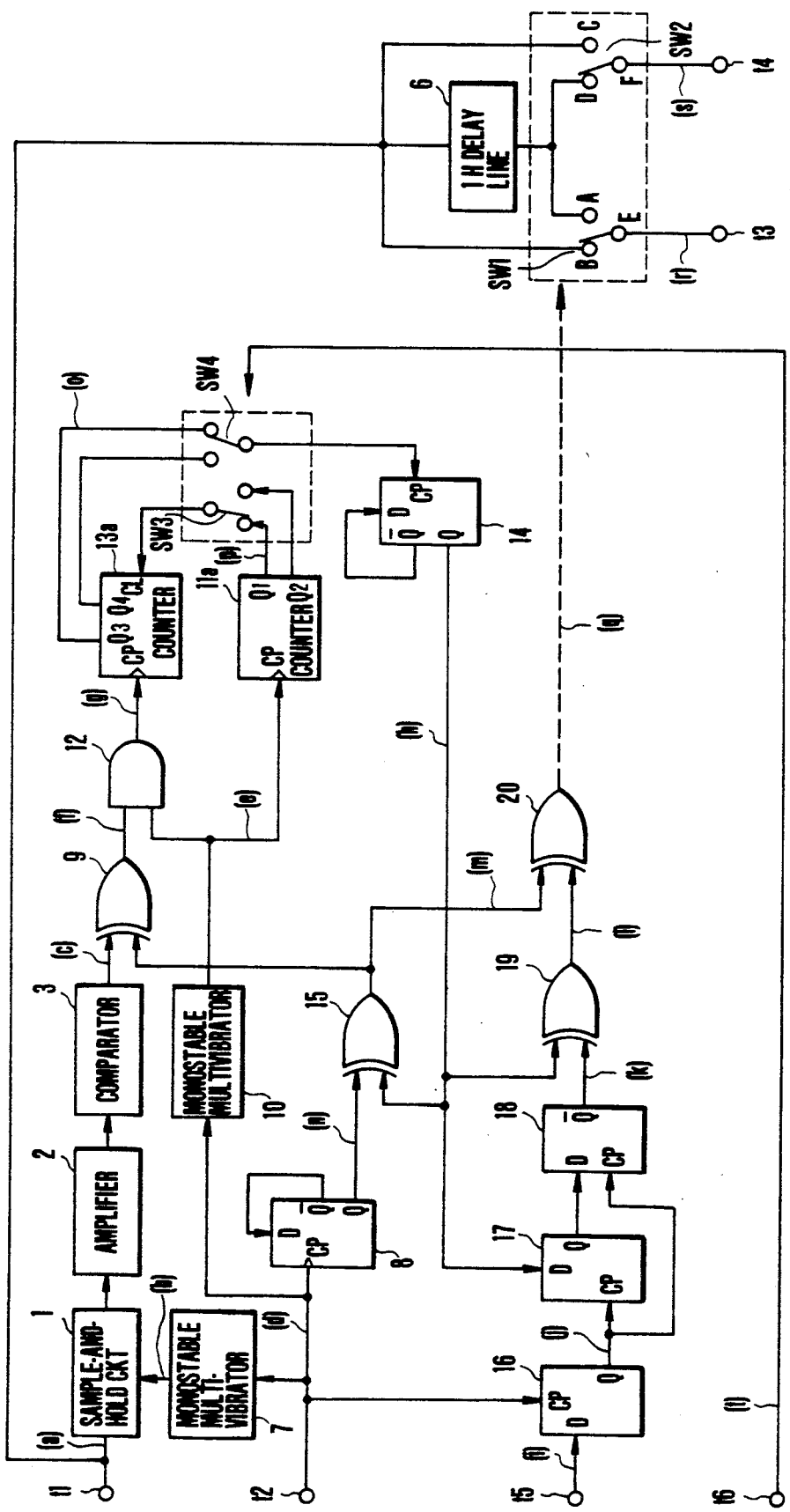
FIG. 8 is a diagram showing the arrangement of the essential parts of a reproducing apparatus arranged as another embodiment.

FIG. 8 shows the essential arrangement of a video signal reproducing apparatus arranged as a further embodiment of this invention. The same component parts as those shown in FIG. 3 are indicated by the same reference numerals and are omitted from the following description: The embodiment includes a counter 11a which is arranged to count the number of pulses of a signal produced from the monostable multivibrator 10. The counter 11a produces a Q1 output (p) at a high level when a first preset number of pulses (such as $2^8$) have been counted and a Q2 signal at a high level when a second preset number of pulses (such as 32) have been counted. Another counter 13a is arranged to count the number of pulses of a signal produced from the AND gate 12. The counter 13a produces a Q3 output (o) at a high level when a third preset number of pulses (such as $2^7$) have been counted and a Q4 output at a high level when a fourth preset number of pulses (such as 16) have been counted. The counter 13a is arranged to be reset either by the Q1 output or the Q2 output of the counter 11a. A DFF 14 is arranged to be triggered by the rise of the Q3 or Q4 output of the counter 13a and to have its output inverted when triggered.

Switches SW3 and SW4 are arranged to have their positions shifted by a TRF signal which comes through a terminal t6 and is arranged to be at a high level only during a transient period as will be further described later herein. The switch SW3 supplies the Q1 output of the counter 11a to the clear terminal of the other counter 13a when the TRF signal is at a low level and supplies the Q2 output of the counter 11a to the clear terminal when the TRF signal is at a high level. The switch SW4 supplies the Q3 output of the counter 13a to the clock pulse input terminal of the DFF 14 when the TRF signal is at a low level and the Q4 output of the counter 13a to the clock pulse input terminal when the signal is at a high level.

Under a normal reproducing condition, the TRF signal (t) is at a low level. This signal is at a high level, for example, at the time of change-over from one reproducing track to another, at the start of reproduction and under other transient condition. If the operation is performed in the same manner as in the case described in the foregoing with the TRF signal (t) at a high level, the phase of the output signal (m) of the EXOR 15 remains unchanged until the counted number of the counter 13a reaches the preset value even when the switch-over operation of the switches SW1 and SW2 is reversely performed, i.e. even when the output signal (q) of the EXOR 20 is at a reverse phase under the transient condition. Therefore, during this period, the phase of the control signal (q) for controlling the switch-over operation of the switches SW1 and SW2 would be inverted. As a result, the kinds (R−Y and B−Y) of the output signals to be supplied to the terminals t3 and t4 as a result of the rearrangement of the line sequential signals into the simultaneous signals would be conversely supplied during that period.

To solve this problem, the embodiment shown in FIG. 8 is arranged to have the Q2 output of the counter 11a supplied to the clear terminal of the counter 13a when the TRF signal (t) is at a high level, i.e. under a transient condition. Then, the Q4 output of the counter 13a is supplied to the clock pulse input terminal of the DFF 14. In other words, under the transient condition, if the switching operation of the switches SW1 and SW2 is contrary during a period of 16 H's within 32 H's, the output signal (q) of the EXOR 20 is inverted to ensure normal rearrangement of the line sequential signals into line simultaneous signals.

In accordance with the above-stated arrangement of the embodiment, a period during which a majority decision is performed is shortened under the transient condition, so that the line simultaneous rearrangement can be carried out without delay. This is an advantage in addition to the advantage of the preceding embodiment shown in FIG. 3.

Further, the TRF signal is arranged to represent a result of discrimination made between a normal condition and a transient condition by some suitable method. When a transient condition instantly shifts to a normal condition, the TRF signal is preferably arranged to remain at a high level for a period of about 32 H's thereafter. This arrangement further ensures a reliable operation.

Figure 9:
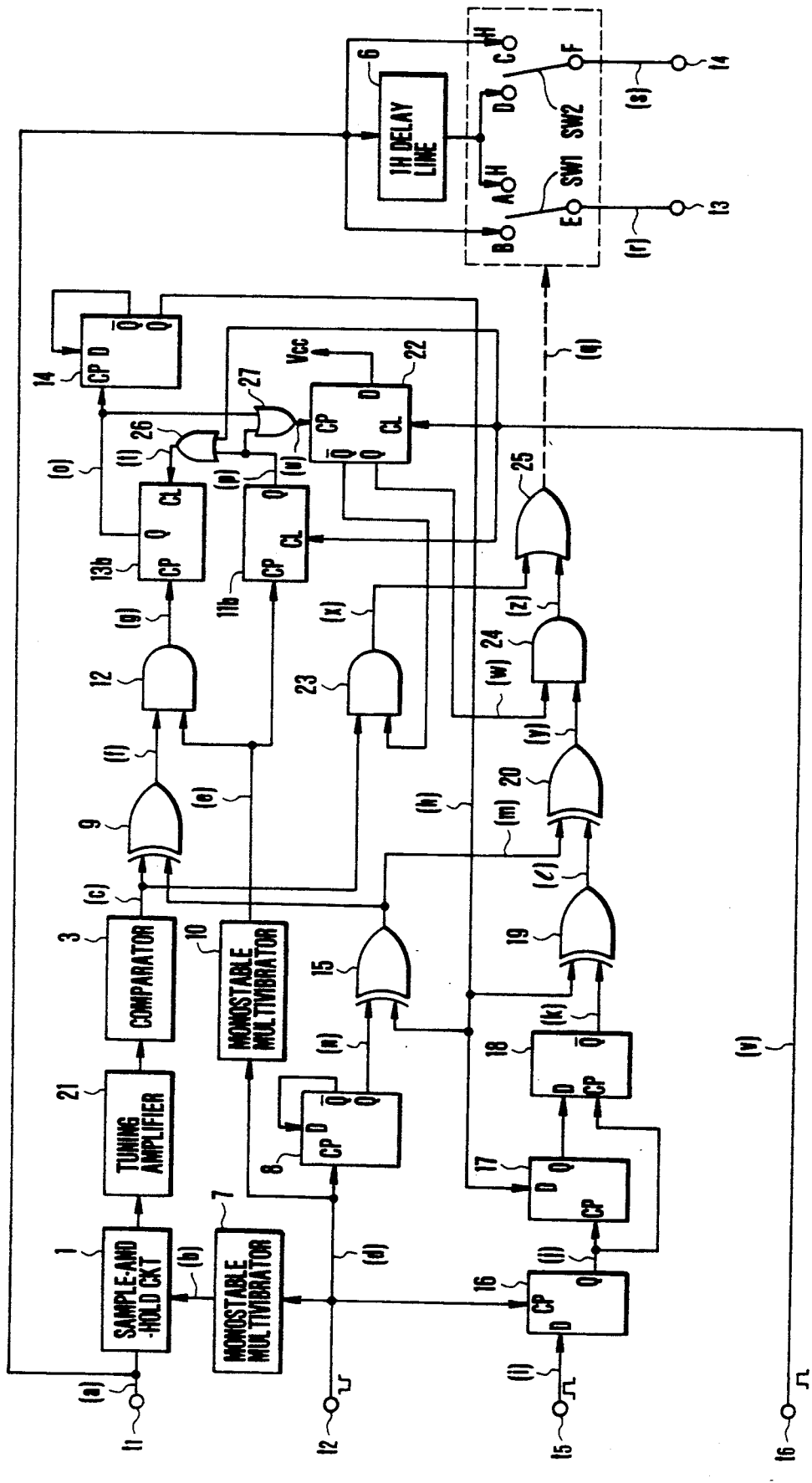
FIG. 9 is a diagram showing the arrangement of the essential parts of a reproducing apparatus embodying this invention as a further embodiment.

FIG. 9 shows the essential arrangement of a video signal reproducing apparatus arranged as a still further embodiment of the invention. The same component elements as those shown in FIG. 3 are indicated by the same reference numerals and symbols used in FIG. 3 and are omitted from the following description.

The embodiment includes a counter 11b which is arranged to count the number of pulses of a signal produced from the monostable multivibrator 10; to produce a Q output at a high level when a preset number of pulses, say $2^8$, have been counted; and to be cleared when the level of a TRF signal, which will be described later, becomes high. Another counter 13b is arranged to count the number of pulses of a signal produced from the AND gate 12; to produce a Q output at a high level when a preset number of pulses, say, $2^7$ have been counted; and to be reset when the level of the output of the OR gate 26 becomes high. An amplifier 21 is arranged to receive the output signal of the sample-and-hold circuit 1 and is tuned for a frequency of ½ H. A DFF 22 is arranged to be triggered by the rise of a clock pulse input and to be constantly provided with a high level data input which is, for example, a power supply voltage. The DFF 22 is cleared by the TRF signal which is at a high level only during a transient period as will be described later. An AND gate 23 is arranged to receive the $\overline{Q}$ output of the DFF 22 and the output signal of the comparator 3. An AND gate 24 is arranged to receive the Q output of the DFF 22 and the output of the EXOR 20. An OR gate 25 is arranged to receive signals produced from the AND gates 23 and 24. An OR gate 26 is arranged to receive the Q output of the counter 11b and the TRF signal. Another OR gate 27 is arranged to receive the Q output SW1 and SW2 are arranged to have their connecting positions switched over from one to the other on the basis of the output of the OR gate 25.

Figure 10:
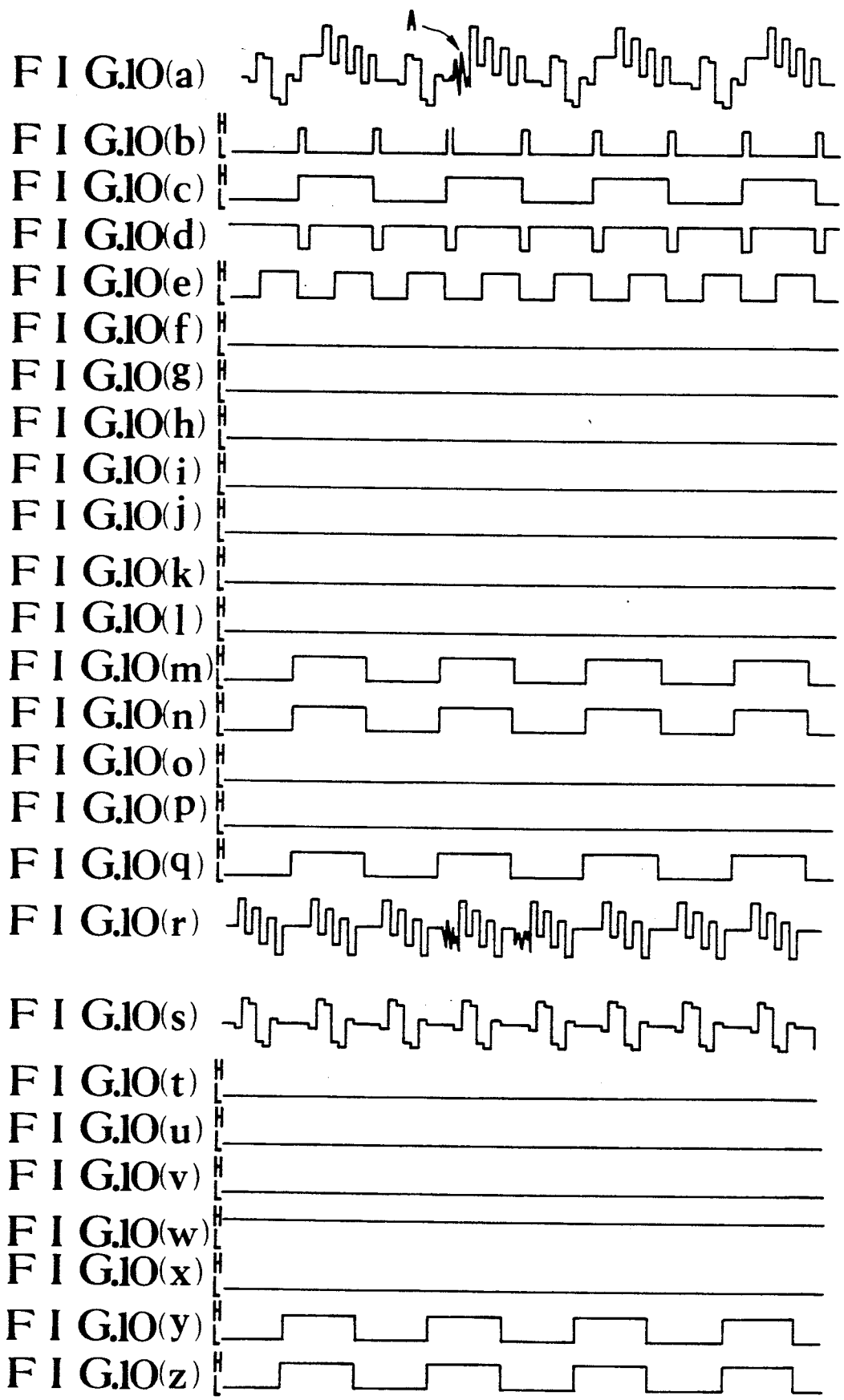
FIGS. 10(a) to 10(z) show, in a timing chart, the waveforms at various points in the reproducing apparatus shown in FIG. 9.
Figure 11:
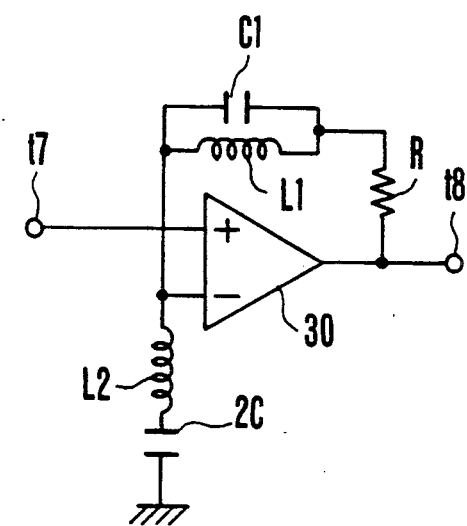
FIG. 11 is a circuit diagram showing, by way of example, the details of an amplifier shown in FIG. 9.

FIGS. 10(a) to 10(z) show in a timing chart, the waveforms at various points (a) to (z) shown in FIG. 9. Referring to these drawings, the operation of each component element of the apparatus shown in FIG. 9 is as follows: Line sequential color difference signals having DC offset parts at intervals of 2 H period, as shown in FIG. 10(a), are supplied via the terminal t1 to the sample-and-hold circuit 1. The line sequential color difference signals, which are thus supplied to the sample-and-hold circuit 1, are sampled for each period during which a signal, shown in FIG. 10(b), is at a high level. Then, the output of the sample-and-hold circuit 1 becomes a signal of ½ H frequency, which is applied to a tuning amplifier 21. FIG. 11 shows, by way of example, the details of the tuning amplifier 21. The amplifier 21 comprises a resistor R1, capacitors C1 and C2; reactances L1 and L2; and a differential amplifier 30. The amplifier 21 is arranged such that a combination of L1 and C1 and another combination of L2 and C2 are in a relation of $f = \frac{1}{2}\pi\sqrt{LC}$ (f ½H=15.734/2 KHz). The value of the resistor R is preferably arranged to be a maximum possible value within and not exceeding the dynamic range of the differential amplifier 30. With the amplifier 21 thus tuned for the ½ H frequency, even in the event of occurrence of a drop-out, as indicated by an arrow A in FIG. 10(a), the output signal (c) of the comparator 3 remains unaffected by the drop-out unless the drop-out period is excessively long.

Let us now assume that the Q output (h) of the DFF 14 is at a low level and that the phase of the output signal (m) of the EXOR 15, to which the Q output (h) of the DFF 14 and the Q output (n) of the DFF 8 are supplied, is the same as that of the output (c) of the comparator 3. In this instance, the signal PG (i) is always at a low level as long as it is not coming from the terminal t5. Therefore, the output signal (j) of the DFF 16 is also at a low level. If the signal (h) is at a low level, therefore, the $\overline{Q}$ output (k) of the DFF 18 is at a high level. Accordingly, the level of the output (l) of the EXOR 19 also becomes low. Therefore, the phase of the output signal (y) of the EXOR 20 becomes the same as that of the output (m) of the EXOR 15. Meanwhile, the TRF signal (v), which is coming from a terminal t6, is arranged to be at a high level during a transient period, such as a period during which one reproducing track is changed over to another, and is at a low level under a normal condition. In this instance, therefore, the TRF signal (v) is at a low level. Assuming that a reproducing operation is being performed under a normal condition, the output level of the counter 11b becomes high at least once. Therefore, the Q output (w) of the DFF 22, which is arranged to be triggered by the rise of the Q output of the counter 11b is at a high level and its $\overline{Q}$ output at a low level.

Accordingly, under a normal reproducing condition, the output signal (z) of the AND gate 24 is the same as the output signal (y) of the EXOR 20. The output (x) of the AND gate 23 is at a low level. A signal (q), which is produced from the OR gate 25, is the same as the output (z) of the AND gate 24. The connecting position of each of the switches SW1 and SW2 is shifted from one to the other with the level of the output signal (q) of the OR gate 25 shifted from a high level to a low level. With these switches SW1 and SW2 operated in this manner, the color difference signals can be rearranged in a line simultaneous state. More specifically stated, when the output signal (y) of the EXOR 20 is at a high level, the contact piece E of the switch SW1 is connected to the contact point A thereof and the contact piece F of the switch SW2 to the contact point C thereof. When the signal (y) is at a low level, the contact piece E is connected to the other contact point B and the contact piece F to the other contact point D, respectively.

In case that the output signal (m) of the EXOR 15 and the output signal (c) of the comparator 3 are in an antiphase relation, the embodiment operates as follows: FIGS. 12(a) to 12(z) show, in a timing chart, the waveforms at various points (a) to (z) in FIG. 9, which are obtained under this condition. With the phase of the output signal of the EXOR 15 not in agreement with that of the output signal (c) of the comparator 3, the output signal (f) of the EXOR 9 is at a high level. Therefore, the output signal (g) of the AND gate 12 becomes the same as the output signal (e) of the monostable multivibrator 10. This causes the counter 13b to count the pulses of the pulse signal obtained from the output of the AND gate 12. When the count value of the counter reaches a preset value ($2^7$), the level of the output signal (o) of the counter 13b becomes high to cause the output signal (h) of the DFF 14 to be inverted. The Q output signal (h) of the DFF 14 is supplied to the EXOR 15. As a result of this, the phase of the output signal (m) of the EXOR 15 is inverted. This brings the output signal (c) of the comparator 3 and the output signal of the EXOR 15 into an equiphase relation. The output (f) of the EXOR 9 then changes to a low level. The output (g) of the AND gate 12 also becomes a low level to bring the counting operation of the counter 13b to a stop. The phase inverted signal then performs a normal control over the switches SW1 and SW2 via the EXOR 20, the AND gate 24 and the OR gate 25.

With the embodiment operating in the above-stated manner, if there is any phase difference between the output signal (c) of the comparator 3 and the output signal (m) of the EXOR 15, they are automatically controlled to bring them into an equiphase relation during a period determined by a preset counting number of the counter 13b. It is obvious that, in the event of many drop-outs or when the line sequential signals have a poor S/N ratio, the preset counting number of the counter 13b is preferably set at a larger value.

As is apparent from FIG. 9, the counter 13b is arranged to be cleared via the OR gate 26 when the Q output of the counter 11b is at a high level. This arrangement means that, during a period (approximately equal to one field period) determined by the preset value ($2^8$) of the counter 11b, the phases of the above-stated two signals (c) and (m) are sampled and the phase of the signal (m) is inverted when the counted value of the counter 13b reaches a preset value during this period. In other words, for line sequential signals of a poor S/N ratio, both of the preset values of the counters 11b and 13b are preferably set at values as large as possible. Incidentally, even when the phases of the two signals (c) and (m) are opposite to each other, the phase of the output signal (m) of the EXOR 15 remains unchanged until the counted number of the counter 13b reaches the preset value. In that event, therefore, the phase of the switch-over control signal (q) for the switches SW1 and SW2 is inverted during that period and, as a result, the kinds (R−Y and B−Y) of the rearranged simultaneous signals to be supplied to the terminals t3 and t4 are conversely produced during this period.

In the case of the embodiment shown in FIG. 9, this problem is solved in the following manner: First, with regard to the transient condition period, such as commencement of reproduction, reproducing track change-over, etc., when one reproducing track is changed to another, for example, the above-stated two signals (c) and (m) are not always in phase. When the TRF signal (v), which comes from the terminal t6, is shifted to a high level, at that instant, the counters 11b and 13b and the DFF 22 are respectively cleared. Then, the $\overline{Q}$ output of the DFF 22 becomes a high level and its Q output (w) a low level. The output signal (z) of the AND gate 24 is at a low level. The output signal (x) of the AND gate 23 comes to coincide with the output signal (c) of the comparator 3. The output signal (q) of the OR gate 25 coincides also with the output (c) of the comparator 3.

When there obtains a normal condition after the transient period, the counters 11b and 13b begin to count with the TRF signal (v) shifted to a low level. At this point of time, if the above-stated two signals (c) and (m) are not in phase, the counter 13b produces a pulse signal as shown in FIG. 12(o) after its counted value reaches a preset value. The pulse signal from the counter 13b inverts the Q output (h) of the DFF 14. As a result of this, the phases of the two signals (c) and (m) come to coincide with each other. Further, at that time, the DFF 22 is triggered via the OR gate 27. The output (q) of the OR gate 25 then shifts from the signal (c) to the signal (y).

In case that the two signals (c) and (m) are in phase when the TRF signal (v) is shifted to the low level, the Q output (p) of the counter 11b is supplied via the OR gate 27 to the DFF 22 before a pulse is produced from the Q output (o) of the counter 13b. This causes the output signal (q) of the OR gate 25 to become the output signal (y) of the EXOR 20. At this time, the output signal (h) of the DFF 14 is not inverted, so that a correct switching signal (q) can be obtained. In other words, the switches SW1 and SW2 can be operated in the best manner by using the output signal (c) of the comparator 3 during a transient period, and by using the output signal (y) of the EXOR 20 under a normal operating condition.

The embodiment has, in addition to the same advantage as the preceding embodiment shown in FIG. 3, an advantage which resides in that: During a transient period, such as commencement of repdocuction, change-over of the reproducing track, etc., the signal obtained from the comparator 3 is used as it is to prevent inversion of the polarity thereof from occurring during a period necessary for a majority deciding process. Therefore, rearrangement into simultaneous signals can be most suitably accomplished both under a normal reproducing condition and a transient reproduction condition.

What is claimed is:

1. A video signal processing apparatus for video signals including line sequential signals, comprising:
   a) rearranging means for rearranging said line sequential signals into line simultaneous signals;
   b) detecting means for detecting the kind of information included in said line sequential signals obtained during each horizontal and scanning period and for outputting an identification signal corresponding to a result of detection;
   c) reference signal generating means for generating a reference signal having a period related to the horizontal scanning period;
   d) comparing means for comparing said identification signal with said reference signal generated by said reference signal generating means and for outputting a comparison signal corresponding to a result of comparison;
   e) monitor means for monitoring a state of said identification signal outputted from said detecting means, by detecting whether or not said comparison signal outputted from said comparing means at every first period indicates an abnormal state, said first period being changeable to a second period; and
   f) control means for controlling a phase of said reference signal generated by said reference signal generating means in accordance with a monitoring result by said monitor means and for controlling said rearranging means.

2. An apparatus according to claim 1, wherein said line sequential signals have their DC level offset for every horizontal scanning period; and said detecting means includes a circuit arranged to detect said offset.

3. An apparatus according to claim 2, wherein said detecting means includes a circuit which is arranged to sample said line sequential signals for every horizontal scanning period.

4. An apparatus according to claim 1, wherein said monitor means includes a counting circuit which counts the number of times of abnormal states of the signal corresponding to the output of said detecting means.

5. An apparatus according to claim 4, wherein said counting circuit is arranged to be cleared at every one of said first periods and said second periods.

6. An apparatus according to claim 1, wherein said control means includes a circuit for controlling the phase of said reference signal in accordance with the monitoring result by said monitor means.

7. An apparatus according to claim 6, wherein said reference signal is a rectangular wave-form signal of a period corresponding to two horizontal scanning periods; and said control circuit is arranged to control the inversion and non-inversion of said rectangular wave form of said reference signal.

8. A video signal processing apparatus for video signals including line sequential color information signals, comprising:
   a) processing means for processing color information included in said video signals;
   b) detecting means for detecting the kind of color information included in said line sequential color information signals of each horizontal scanning period and for outputting an identification signal corresponding to a result of detection;
   c) reference signal generating means for generating a reference signal;
   d) comparing means for comparing said identification signal with said reference signal generated by said reference signal generating means and for outputting a comparison signal corresponding to a result of comparison;
   e) monitor means for monitoring a state of said identification signal outputted from said detecting means by detecting whether or not said comparison signal outputted from said comparing means at every first period indicates an abnormal state, said first period being changeable to a second period; and
   f) control means for controlling a phase of said reference signal generated by said reference signal generating means in accordance with a monitoring result by said monitor means and for controlling said processing means.

9. An apparatus according to claim 8, wherein said processing means includes a circuit arranged to form color information signals of a plurality of kinds from said line sequential color information signals.

10. An apparatus according to claim 8, wherein said monitor means includes a counting circuit which counts the number of times of abnormal states of the signal corresponding to the output of said detecting means.

11. An apparatus according to claim 10, wherein said first period or said second period is related to the horizontal period of said video signal, and said counting circuit is arranged to be cleared at every one of said first periods or second periods and to output a control signal to said control means when the count value exceeds a first count value or a second count value.

12. An apparatus according to claim 8, further comprising:
   reproducing means for reproducing said video signals including line sequential signals from a recording medium.

13. A video signal processing apparatus for processing video signals including line sequential signals which have their DC level offset for every horizontal scanning period, comprising:
   a) means for rearranging said line sequential signals into line simultaneous signals;
   b) detecting means for detecting a kind of information included in said line sequential signals by sampling said line sequential signals and detecting the DC level offset for every horizontal scanning period and for outputting an identification signal corresponding to a result of the detection;
   c) periodic signal generating means for generating a periodic signal having a period related to the horizontal scanning period;
   d) comparing means for comparing said identification signal with the periodic signal and for outputting a comparison signal corresponding to a result of comparison;
   e) phase shifting means for monitoring a state of said identification signal outputted from the detecting means by detecting whether or not said comparison signal outputted from said comparing means indicates an abnormal state, and for shifting the phase of the periodic signal in accordance with results of the monitoring; and f) control means for controlling the rearranging means by using either said identification signal from said detecting means or said periodic signal which is phase shifted by said phase shifting means.

14. A video signal processing apparatus for processing video signals including line sequential signals, comprising:

a) detecting means for detecting a kind of information included in said line sequential signals obtained during each horizontal scanning period and for outputting an identification signal corresponding to a result of detection;

b) comparing means for comparing said identification signal with a reference signal and for outputting a comparison signal corresponding to a result of comparison;

c) monitor means for monitoring a state of said identification signal outputted from said detecting means by detecting whether or not said comparison signal outputted from said comparison means at every either one of a plurality of different kinds of periods each synchronized with the horizontal scanning period indicates an abnormal state; and d) change-over means for changing the period of monitoring operation of said monitor means.

15. An apparatus according to claim 14, wherein said monitor means includes a counting circuit which counts the number of times of abnormal states of the signal corresponding to the output of said detection means.

16. An apparatus according to claim 15, wherein said change-over means includes a first change-over circuit which changes over one of the plurality kinds of periods which resets said counting circuit.

17. An apparatus according to claim 16, wherein said change-over means includes a second change-over circuit which is arranged to change over, from one to another, a counting value at which said counting circuit produces a predetermined output.

18. An apparatus according to claim 14, wherein said line sequential signals include color information of a plurality of kinds; and said detecting means is arranged to detect the kinds of said color information.

19. An apparatus according to claim 18, further comprising:

processing means for processing said color information; and control means for controlling said processing means in accordance with monitoring results of said monitor means.

20. An apparatus according to claim 19, wherein said processing means includes a circuit which is arranged to form color information signals of a plurality of kinds from said line sequential signals.

21. A video signal processing apparatus for processing sequential signals, comprising:

a) rearranging means for rearranging said line sequential signals into line simultaneous signals;

b) detecting means for detecting a kind of information included in said line sequential signals and outputting an identification signal corresponding to a result of detection;

c) comparing means for comparing said identification signal with a reference signal and for outputting a comparison signal corresponding to a result of comparison;

d) monitor means for monitoring a state of said identification signal outputted from said detecting means by detecting whether or not said comparison signal outputted from said comparing means during first period indicates an abnormal state, said first period being changeable to a second period; and d) control means for controlling said rearranging means in accordance with a monitoring result by said monitor means.

22. A signal processing apparatus according to claim 21, wherein said detecting means detects the kind of information included in said sequential signal by detecting the kind of discriminating signal included in said sequential signal.

23. A signal processing apparatus according to claim 21, wherein said first periods or said second periods correspond to a plurality of periods of said sequential signal, respectively.

* * * * *